United States Patent
Tamiozzo

(10) Patent No.: US 9,771,960 B2
(45) Date of Patent: Sep. 26, 2017

(54) CONNECTION ARRANGEMENT OF AT LEAST TWO BODIES, IN PARTICULAR AT LEAST TWO BODIES OF COMPONENTS OF A MECHANICAL AUTOMATION GROUP OF MOVEMENTS, WITH A REMOVABLE CONSTRAINING GROUP

(71) Applicant: METAL WORK S.P.A., Concesio (BS) (IT)

(72) Inventor: Corrado Tamiozzo, Brescia (IT)

(73) Assignee: METAL WORKS S.P.A., Concesio (BS) (IT)

( * ) Notice: Subject to any disclaimer, the term of this patent is extended or adjusted under 35 U.S.C. 154(b) by 536 days.

(21) Appl. No.: 14/360,509

(22) PCT Filed: Nov. 30, 2012

(86) PCT No.: PCT/IB2012/056862
§ 371 (c)(1),
(2) Date: May 23, 2014

(87) PCT Pub. No.: WO2013/080172
PCT Pub. Date: Jun. 6, 2013

(65) Prior Publication Data
US 2014/0314476 A1    Oct. 23, 2014

(30) Foreign Application Priority Data
Dec. 2, 2011    (IT) ............... MI2011A2202

(51) Int. Cl.
*F16B 2/12*    (2006.01)
*F16B 5/00*    (2006.01)

(52) U.S. Cl.
CPC .............. *F16B 2/12* (2013.01); *F16B 5/0072* (2013.01); *Y10T 403/648* (2015.01)

(58) Field of Classification Search
CPC ........ F16B 2/12; F16B 5/0072; F16B 5/0052; F16B 37/045; Y10T 403/648;
(Continued)

(56) References Cited

U.S. PATENT DOCUMENTS 2,887,669 A * 5/1959 Sylvester ................. H01R 4/38
                                                    403/391
3,046,006 A * 7/1962 Kulicke, Jr. ........... B23Q 1/262
                                                    248/913
(Continued)

FOREIGN PATENT DOCUMENTS

| FR | 2584115 A1 | 1/1987 |
| FR | 2828914 A1 | 2/2003 |
| NL | 7313621 A | 4/1974 |

OTHER PUBLICATIONS

International Search Report for PCT/IB2012/056862, dated Mar. 25, 2013.

*Primary Examiner* — James Ference
(74) *Attorney, Agent, or Firm* — Hedman & Costigan, P.C.; James V. Costigan; Kathleen A. Costigan

(57) ABSTRACT

A connection arrangement (10) comprising at least two bodies (11*a*, 11*b*), in particular at least two bodies of components of a mechanical automation group of movements, to be connected to each other and a constraining group (12) of these two bodies (11*a*, 11*b*) removably to each other, wherein each of the two bodies comprises a mutual rest surface (13*a*, 13*b*) for resting on each other and a coupling profile (14*a*, 15*a*, 14*b*, 15*b*) with the constraining group (12) defined in correspondence of at least two opposite perimetric portions of the respective mutual rest surface (13*a*, 13*b*), and wherein the constraining group (12) comprises at least one pair of tightening clamps (17, 18) which are engageable with the coupling profiles (14*a*, 15*a*, 14*b*,
(Continued)

15b) and which are removably connectable together by at least one connecting member (19).

18 Claims, 6 Drawing Sheets

(58) Field of Classification Search
CPC ......... Y10T 403/7094; Y10T 403/7141; Y10T 403/46; Y10T 403/5766; Y10T 403/589; Y10T 403/7062; E04B 2001/2664
USPC ....... 24/486, 526, 527, 528, 136 R; 403/381, 403/338, 391, 312, 373
See application file for complete search history.

(56) References Cited

U.S. PATENT DOCUMENTS

| | | | | |
|---|---|---|---|---|
| 3,390,901 A * | 7/1968 | Bibb | | H01P 1/042 285/406 |
| 3,547,472 A * | 12/1970 | Ehrman | | A47B 47/0041 312/140 |
| 4,025,216 A * | 5/1977 | Hives | | F16B 12/26 108/158.12 |
| 4,082,324 A * | 4/1978 | Obrecht | | F15B 13/0814 137/271 |
| 4,171,838 A * | 10/1979 | Grundy | | B60R 19/52 293/148 |
| 4,461,594 A * | 7/1984 | Waber | | B25H 1/0021 248/122.1 |
| 4,497,148 A * | 2/1985 | Lopez | | E04B 1/617 52/126.3 |
| 4,592,117 A * | 6/1986 | Ruehl | | F16G 11/04 24/129 R |
| 4,652,095 A * | 3/1987 | Mauro | | G01B 5/0002 108/143 |
| 4,735,451 A * | 4/1988 | Wojciechowski | | B25J 15/028 269/234 |
| 5,056,766 A * | 10/1991 | Engibarov | | B25B 5/08 269/101 |
| 5,060,920 A * | 10/1991 | Engibarov | | B25B 1/2452 269/282 |
| 5,123,770 A * | 6/1992 | Trenner | | F16B 2/12 403/310 |
| 5,365,641 A * | 11/1994 | Watanabe | | A45C 13/1046 24/115 G |
| 5,369,900 A * | 12/1994 | Garrison | | G09F 7/00 40/590 |
| 5,547,330 A * | 8/1996 | Walimaa | | F16M 11/043 269/71 |
| 5,551,795 A * | 9/1996 | Engibarov | | B23Q 1/28 269/73 |
| 5,664,793 A * | 9/1997 | Engibarov | | B23B 31/16279 269/283 |
| 5,716,043 A * | 2/1998 | Iwata | | B23Q 1/28 269/100 |
| 5,815,894 A * | 10/1998 | Soriano | | A01K 97/08 24/297 |
| 5,860,197 A * | 1/1999 | Fox | | B25B 1/103 24/455 |
| 6,073,753 A * | 6/2000 | Marsetti | | B65G 13/11 198/786 |
| 6,076,655 A * | 6/2000 | Marsetti | | B65G 21/2054 198/445 |
| 6,135,670 A * | 10/2000 | Bahnman | | E21B 19/12 166/77.51 |
| 6,174,102 B1* | 1/2001 | Do | | B23Q 1/282 269/71 |
| 6,176,641 B1* | 1/2001 | Schenk | | B23Q 1/0063 248/223.41 |
| 6,200,062 B1* | 3/2001 | You | | F16B 12/20 403/230 |
| 6,598,729 B2* | 7/2003 | Marsetti | | B65G 39/12 193/35 R |
| 6,621,008 B1* | 9/2003 | McPhail | | H01B 17/56 174/135 |
| 7,199,494 B2* | 4/2007 | Rapp | | B23Q 5/40 310/17 |
| D547,637 S * | 7/2007 | Blacker | | D8/354 |
| 7,518,268 B2* | 4/2009 | Choi | | G02B 7/02 310/12.16 |
| 7,850,000 B2* | 12/2010 | Andreoli | | B65G 21/2054 198/836.1 |
| 7,909,530 B2* | 3/2011 | Okura | | E04B 1/2604 403/230 |
| 2003/0175075 A1* | 9/2003 | Garrison | | B23Q 1/0063 403/381 |
| 2005/0089363 A1* | 4/2005 | Curtis | | A61F 2/76 403/362 |
| 2008/0213040 A1* | 9/2008 | Morze-Reichartz | | E04B 1/2604 403/381 |
| 2010/0034582 A1* | 2/2010 | Howlett | | F16B 5/0052 403/333 |
| 2014/0314476 A1* | 10/2014 | Tamiozzo | | F16B 2/12 403/338 |

\* cited by examiner

CONNECTION ARRANGEMENT OF AT LEAST TWO BODIES, IN PARTICULAR AT LEAST TWO BODIES OF COMPONENTS OF A MECHANICAL AUTOMATION GROUP OF MOVEMENTS, WITH A REMOVABLE CONSTRAINING GROUP

The present invention relates to a connection arrangement of at least two bodies, in particular at least two bodies of components of a mechanical automation group of movements, with a removable constraining group.

The present invention also relates to a component of a mechanical automation group of movements, in particular an actuator, a slide, pliers, a section bar, a guiding section bar or similar, and to a removable constraining group for connecting two of these components together.

For the purposes of the present description, a mechanical automation group of movements shall indicate a set of transmission, transformation and linear or rotary motion control components that are connected and combined to each other in order to be able to carry out a predefined series of movements, with the exclusion of the components of the power circuit that supplies this group.

These components comprise, in particular, pneumatic, hydraulic or electric actuators, slides, pliers, section bars, guiding section bars or similar.

Mechanical automation groups of this type are utilised, in particular, in operating machines intended for the handling, processing or assembling of parts.

Consider, for example, the manipulator arms or the so-called "pick-and-place" systems that carry out, in an automated manner, the picking up of a piece from a first location, the displacement of the piece thus picked up to a second location where they release it having possibly first modified the spatial orientation thereof.

In these mechanical automation groups the movements of elementary translation along the three Cartesian axes, of rotation with respect to these same axes and of picking and releasing of the individual pieces, are carried out by respective linear and rotary actuators and by pliers that are combined and connected together so as to obtain the desired series of movements.

Depending on the operating machine and on the respective mechanical automation group of movements to be produced, it is necessary to select, at the designing stage, the type of actuators and/or pliers to be utilised depending on the expected loads, the stroke of the individual movements to be produced and of the available spaces, and to mechanically connect them to each other.

If a pick-and-place system is to be produced, it is possible, purely by way of example, to provide pliers mounted onto a rotary actuator adapted to make a rotation having an amplitude of 90° around a horizontal axis, wherein the rotary actuator is, in turn, mounted onto a slide controlled by a linear actuator arranged with vertical axis and in turn fixed onto a slide controlled by a linear actuator arranged with horizontal axis. Such an arrangement allows, for example, a piece to be picked up from a first location, rotated and vertically and horizontally moved towards a second location where it is released.

The various components of such a mechanical automation group of movements must be connected to each other in the designed sequence.

Traditionally, this connection is of the removable type and provides the use of plates, brackets, set squares and support blocks, each of which has a series of threaded holes in which the threaded members that lock onto them the individual components engage.

The "tailored" design and production of each single connection arrangement in function of the operating machine and of the mechanical automation group to be produced is particularly time-consuming and costly, and also limits the possibility of modifications and changes.

In order to overcome this drawback, different connection systems have been developed that are in some way "normalised" or "standardised" and which allow the various components to be connected in different possible configurations.

A first known connection system provides the use of so-called "adapters", consisting of one or more plates, which are variously shaped and are interposed between two components to be connected, and by fastening members of the removable type for the fastening of the plates to each other and to each of the two components to be connected.

Depending on the type of components to be connected and in function of the different possibilities of connecting these components, it is however necessary to have a wide range of different "adapters".

This consequently entails a complication and a series of charges, in terms of time and cost, for the design, production, establishment and stock management of different types of "adapters".

Furthermore, irrespective of how vast the range of provided "adapters" is, the types of achievable connection are in any case limited and do not satisfy all possible cases.

A second known connection system provides the production on each component, in particular on each actuator, of a plurality of threaded and non-threaded holes and a plurality of precision holes, where the former are provided for coupling with or the passage of threaded connection members and the latter are provided for coupling with reference pins. The arrangement, the number and the size of the threaded and non-threaded holes and of the precision holes are identically replicated on a plurality of types of component (actuators).

This known connection system allows to two components, even of different types, to be directly connected one to the other without the need to interpose any type of adaptor between them. This consequently has the advantage of containing the dimensions of the connection arrangement as a whole and the advantage of ensuring a greater rigidity of the connection between the various components.

Nevertheless, this known connection system also presents limits of application.

Indeed, for various technical reasons the arrangement, the number and the dimensions of the threaded and non-threaded holes and of the precision holes is not identically replicated on all possible types of components, so that only components of types presenting threaded and non-threaded holes and precision holes that are compatible with each other in number, arrangement and dimensions can be connected together.

A third known connection system provides for the obtainment of a portion that, in the transverse section, has a dovetail form in correspondence of at least one face of each component. Two components of this type are connected together at the respective dovetail portions by means of a pair of locking clamps that are joined together by one or more threaded stems and that grip these two portions arranged facing and opposed to each other.

Each of the two clamps presents a central "insert" portion that is interposed between the two dovetail portions, acting as a spacer for the two components to be connected. The threaded stems that join the two clamps are housed in the space created between the two components to be connected, thus spaced one from the other.

A connection system of this type is described for example in U.S. Pat. No. 5,123,770 in the name of Montech AG.

A connection system of this type has the advantage of being particularly simple and of allowing the connection of different types of components, provided that each is equipped with at least a dovetail portion, being it necessary to have a limited number of "adapters", i.e. locking clamps.

Furthermore, such a connection system allows adjustment, during the assembly step, of the relative position of the two components along the longitudinal axis of the dovetail portions and which extends orthogonally to the axis along which the threaded stems that connect the two clamps extend.

Nevertheless, this known connection system also presents a few drawbacks.

A first drawback is represented in that the two components connected to each other are spaced one from the other, which, on the one hand, increases the dimensions of the connection arrangement as a whole and, on the other hand, reduces the stiffness of connection.

A second drawback consists in that the possibility of sliding along the longitudinal axis of the dovetail portions may give rise, under conditions of use, to relative displacements of the two components which are not desired and which are caused by vibrations or excessive loads for example.

In addition, such a connection system lacks any reference to the relative position of the two components along the longitudinal axis of the dovetail portions. In the case of maintenance or replacement operations requiring the disassembly and reassembly of the two components, a particular expertise is required, on the part of the operators in charge, in searching for the original and correct relative position of the components themselves with the use of measurement instruments and waste of time.

A connection system as described in DE-19951452-A1 in the name of Montech AG has been proposed to overcome this latter drawback.

The connection system described in DE-19951452-A1 provides the use of a plurality of reference pins each of which has one end inserted in a seat obtained in one of the two clamps and the opposite end inserted in a seat obtained in the respective component or piece to be connected.

This solution is however structurally complicated and requires the processing of both the fastening clamps and of both the components or pieces to be connected for the production therein of a corresponding plurality of insertion seats for the reference pins.

In addition, this solution also suffers from the same disadvantages indicated with reference to U.S. Pat. No. 5,123,770 as concerns the dimensions and the rigidity of the connection arrangement considered as a whole.

The aim of the present invention is that of overcoming the drawbacks of the prior art.

Within the scope of this general aim, one particular aim of the present invention is that of proposing a connection arrangement of at least two bodies, in particular at least two bodies of components of a mechanical automation group of movements, with a removable constraining group, that is compact and of contained dimensions and which allows a greater rigidity of connection to be achieved.

Another aim of the present invention is that of proposing a connection arrangement of at least two bodies, in particular at least two bodies of components of a mechanical automation group of movements, with a removable constraining group, which allows the relative position of the two bodies connected together to be determined and replicated, so as to be able to carry out subsequent disassembly and reassembly operations of the two bodies themselves with ease and precision.

Yet another aim of the present invention is that of proposing a connection arrangement of at least two bodies, in particular at least two bodies of components of a mechanical automation group of movements, with a removable constraining group that is structurally and constructively simple.

A still further aim of the present invention is that of proposing components for the production of a mechanical automation group of movements, of the actuator, slide, pliers, section bar, guiding section bar and similar type, and a removable constraining group of said components that are modular and "normalised" so that they can be combined and assembled together in a simple manner in order to produce a desired movements automation group.

A further aim of the present invention is that of proposing a connection arrangement of at least two bodies, in particular at least two bodies of components of a mechanical automation group of movements, with a removable constraining group that is particularly simple and functional, with contained costs.

These aims according to the present invention are achieved by producing a connection arrangement of at least two bodies, in particular at least two bodies of components of a mechanical automation group of movements, with a removable constraining group, as claimed in claim 1.

These aims are also achieved by producing components of a mechanical automation group of movements and a constraining group thereof as claimed in claim 11.

Further characteristics are specified in the dependent claims.

The characteristics and advantages of a connection arrangement of at least two bodies, in particular at least two bodies of components of a mechanical automation group of movements, with a removable constraining group, of a component of a movements mechanical automation group and of a removable constraining group of at least two of these components according to the present invention will become clearer from the following illustrative and non-limiting description, referring to the accompanying schematic drawings, wherein.

Figure 1:
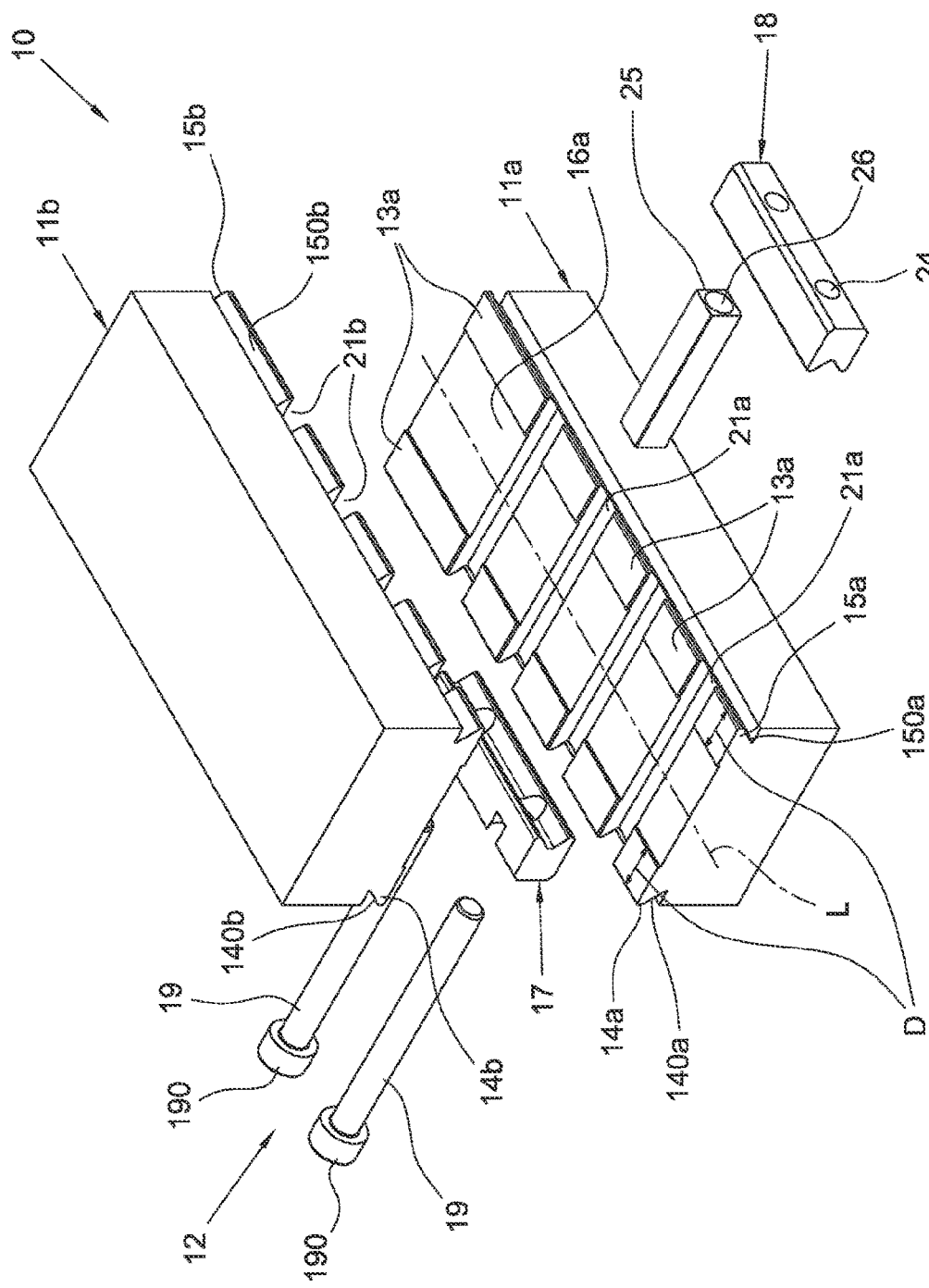
FIG. 1 is an axonometric and exploded view of a connection arrangement according to the present invention.

With reference to the accompanying figures, a connection arrangement comprising at least two bodies 11a and 11b to be connected one to the other and a constraining group 12 of these two bodies 11a and 11b one to the other in a removable manner is globally indicated by 10.

The two bodies 11a and 11b are the bodies of components of a mechanical automation group of movements, in particular of components for transmitting, transforming and controlling movements that are linear, rotary or a combination thereof, with the exclusion of the components of the power circuit that supplies the mechanical automation group.

The two bodies 11a and 11b, for example, can be the bodies of linear or rotary actuators of the pneumatic, hydraulic or electric type, pliers, slides, section bars, guiding section bars and similar.

It should be noted that, in the accompanying figures, the two bodies 11a and 11b are only schematically illustrated as regards the portion thereof that is inherent to the present invention.

In addition, as regards the characteristics of the present invention, the two bodies 11a and 11b are modular and "normalised", therefore corresponding elements are indicated by the same reference number respectively indexed by the letters "a" and "b"

Each of the two bodies 11a, 11b comprises a mutual rest surface 13a, 13b for resting one on the other and, in correspondence of at least two opposite perimetric portions of the respective surface 13a, 13b, a respective coupling profile 14a, 15a and 14b, 15b with the constraining group 12.

The surfaces 13a, 13b are flat and fit together along at least one dimension D.

The coupling profiles 14a, 15a and 14b, 15b extend along a respective line incident the dimension D.

With particular reference to the embodiment represented, the coupling profiles 14a, 15a, and 14b, 15b extend along a respective straight line that is orthogonal to the dimension D.

In greater detail, the surfaces 13a, 13b are defined in correspondence of at least one face of the respective body 11a, 11b.

Each of the two surfaces 13a, 13b has, considered as a whole, an overall straight quadrangular shape the dimension D of which coincides with the width.

The coupling profiles 14a, 15a and 14b, 15b are defined along the opposite sides of the surfaces 13a, 13b and extend for at least a portion of their length L.

Each of the two surfaces 13a, 13b is defined by a pair of plane projections having a straight quadrangular form that extend in parallel to the longitudinal development of the respective body 11a, 11b and which are spaced one from the other by a lowered portion 16a, 16b. This conformation of the mutual rest surfaces 13a, 13b allows a resting of the two bodies 11a, 11b to be obtained without these undergoing deformations induced by a non-perfect flatness of these same surfaces following the tightening of the constraining group 12.

In this case, the dimension D is given by the sum of the widths of the two projection planes that define each of the two surfaces 13a, 13b.

Furthermore, as will become clearer from the following description, the surfaces 13a, 13b as well as the coupling profiles 14a, 15a and 14b, 15b are discontinuous and segmented, being interrupted by one or more transverse grooves.

Each coupling profile 14a, 15a and 14b, 15b consists of an inclined wall 140a, 150a and 140b, 150b which extends from the respective outer perimeter edge of the respective surface 13a, 13b and which forms an acute angle with the latter.

The two coupling profiles 14a, 15a and 14b, 15b and the respective surface 13a, 13b define a dovetail-shaped portion in the respective body 11a, 11b.

The constraining group 12 comprises at least one pair of tightening clamps 17 and 18 which are engageable with the coupling profiles respectively 14a, 14b and 15a, 15b of the two bodies 11a, 11b that mutually overlap each other.

The tightening clamps 17 and 18 are removably connectable to each other by one or more connecting members each of which consists of a threaded stem 19.

According to a peculiar characteristic of the present invention, each threaded stem 19 is housed with clearance in a corresponding seat 20 defined by at least one groove 21a, 21b obtained in at least one of the two bodies 11a, 11b and which passes between the respective opposite perimetric portions in correspondence of which the coupling profiles 14a, 15a and 14b, 15b are obtained.

In greater detail, each body 11a, 11b comprises one or more grooves 21a, 21b which extend in parallel to the dimension D and, therefore, orthogonally to the coupling profiles 14a, 15a and 14b, and 15b and which are defined open in correspondence of the respective mutual rest surface 13a, 13b.

The grooves 21a, 21b are spaced from each other at a predefined distance one from each other; advantageously the grooves 21a, 21b are at a constant pitch one after the other.

Considering the two bodies 11a, 11b in the connection configuration, wherein the surfaces 13a and 13b are resting directly one on the other, one or more grooves 21a, 21b of one of the two bodies 11a, 11b faces a respective groove 21b, 21a of the other body 11b, 11a defining a respective seat 20 in which a threaded stem 19 can be housed.

Each of the two tightening clamps 17 and 18 comprises a pair of flat internal surfaces, respectively 171, 172 and 181, 182 incident each other and joined to form a V, U or the like without the interposition between them of any portion intended to act as a spacer of the two bodies 11a, 11b to be connected.

Considering the two bodies 11a, 11b in the connection configuration, wherein the surfaces 13a and 13b are resting directly one on the other, the internal surfaces 171, 172 and 181, 182 of the two tightening clamps 17 and 18 go to rest on the inclined walls 140a, 140b and 150a, 150b, or vice versa, of the coupling profiles respectively 14a, 14b and 15a, 15b of the two mutually overlapping bodies 11a, 11b.

With particular reference to the embodiment illustrated in the accompanying figures, each threaded stem 19 presents a head 190 at one end.

Each of the two tightening clamps 17 and 18 has a longitudinal extension and presents one or more holes for the passage and/or coupling with a respective threaded stem 19.

In particular, one of the two tightening clamps, in the case represented tightening clamp 17, presents one or more through holes 22, each of which widens into a lowered seat 23 on which the head 190 of a corresponding threaded stem 19 abuts.

The other of the two tightening clamps, in the case represented tightening clamp 18, presents one or more threaded holes 24 wherein the opposite end of a respective threaded hole 19 is engaged.

So that it is possible to tighten or loosen the two tightening clamps 17 and 18 by acting on the threaded stems 19.

According to a further peculiar characteristic of the present invention, the constraining group 12 further comprises one or more tongues 25 that are removably insertable into the grooves 21a, 21b of the two bodies 11a, 11b.

In one embodiment, the tongues 25 are crossed by a through axial hole 26 for the passage therein of the threaded stem 19.

Figure 2:
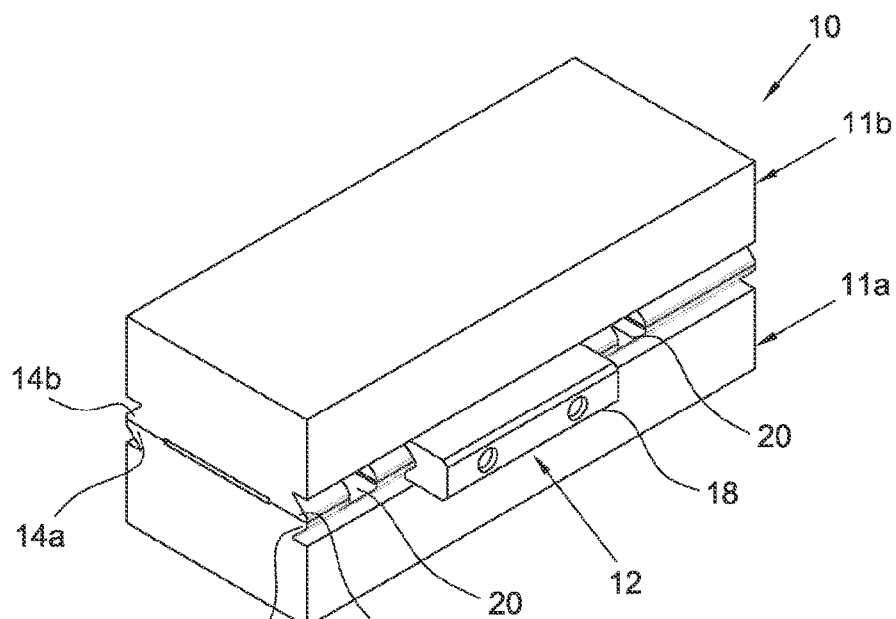
FIG. 2 is an axonometric view of the connection arrangement of FIG. 1 in assembled configuration.
Figure 3:
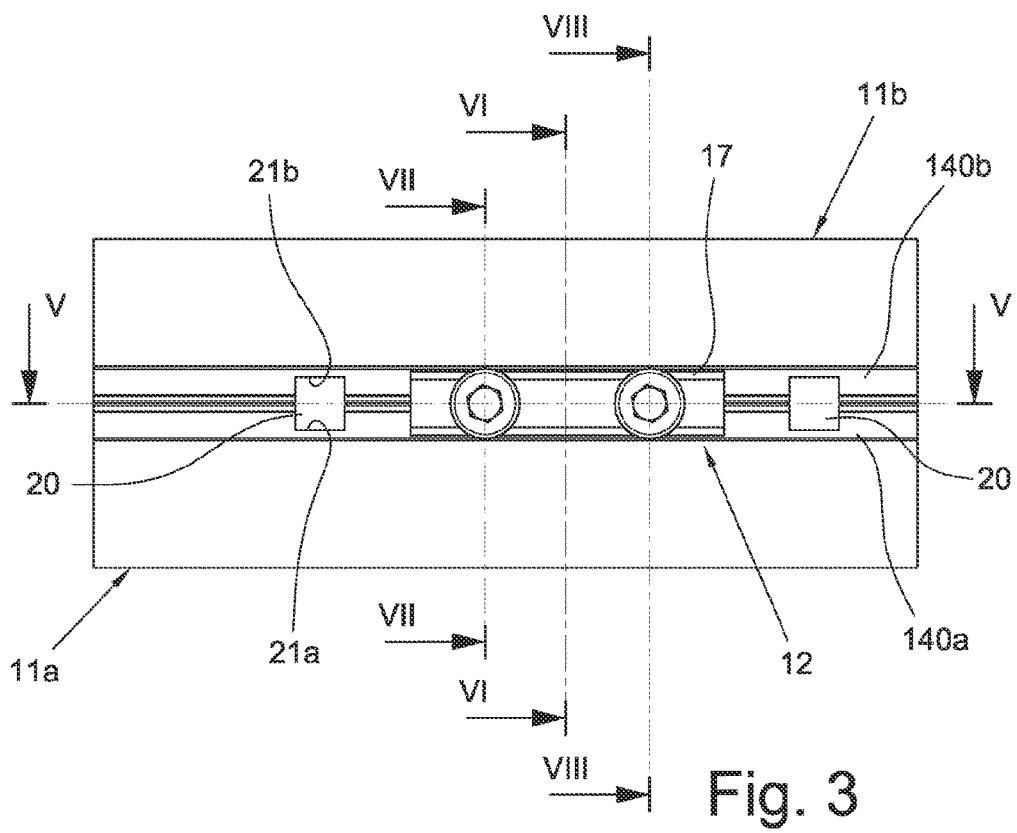
FIG. 3 is a front view of FIG. 2.
Figure 4:
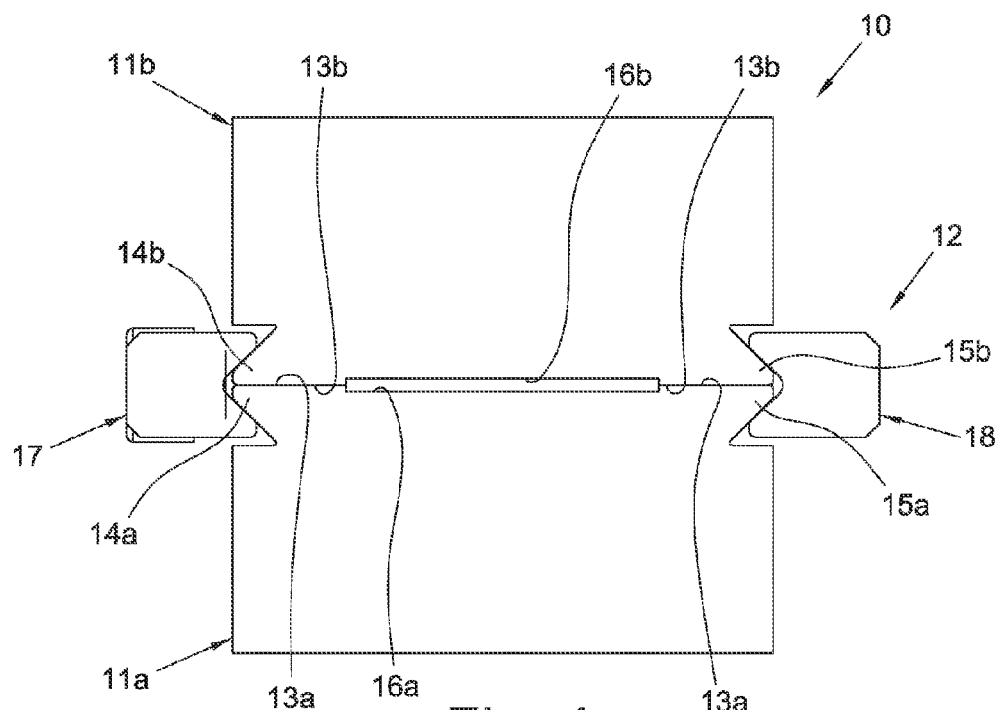
FIG. 4 is a side view of FIG. 2.
Figure 5:
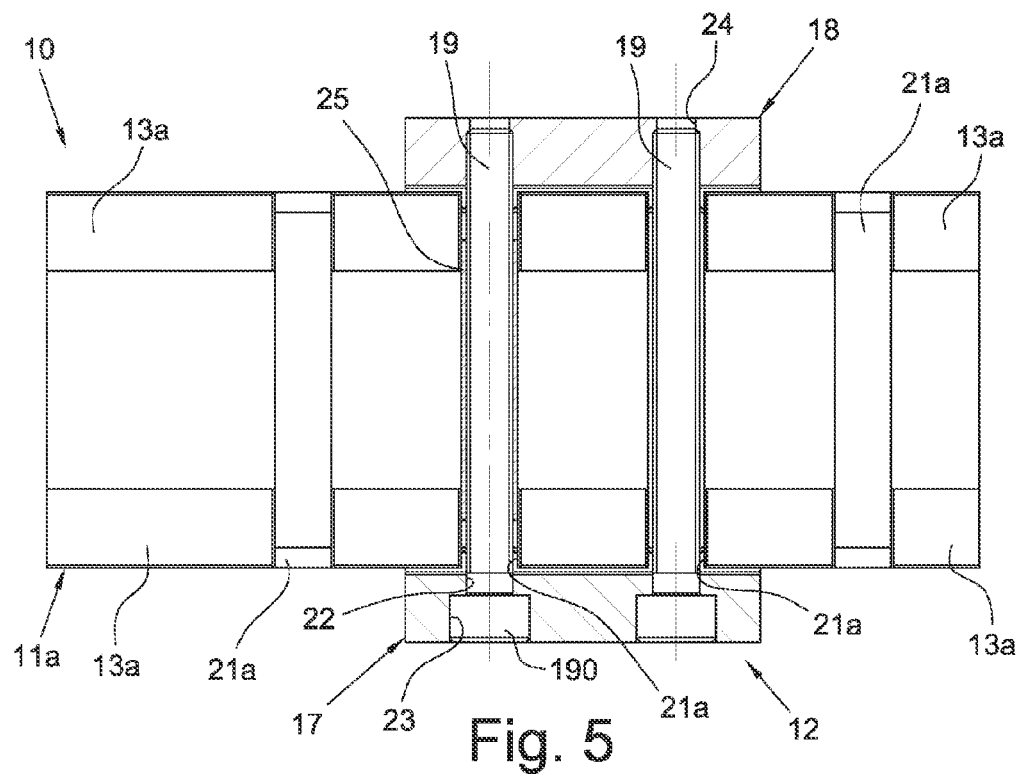
FIG. 5 is a cross-section along the V-V plane of FIG. 3.
Figure 6:
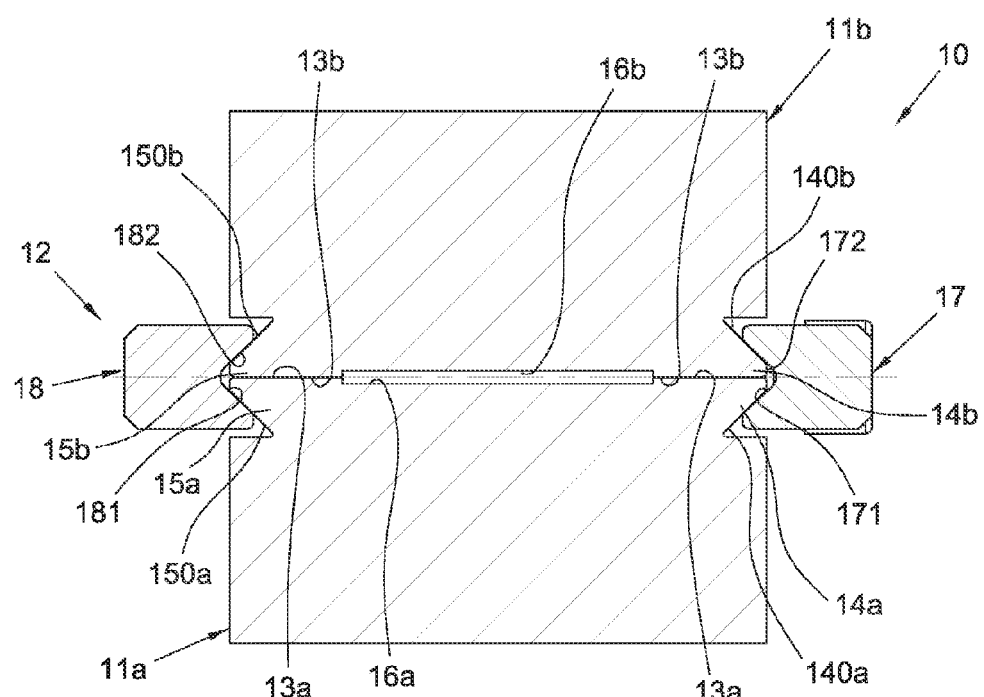
FIG. 6 is a cross-section according to the VI-VI plane of FIG. 3.
Figure 7:
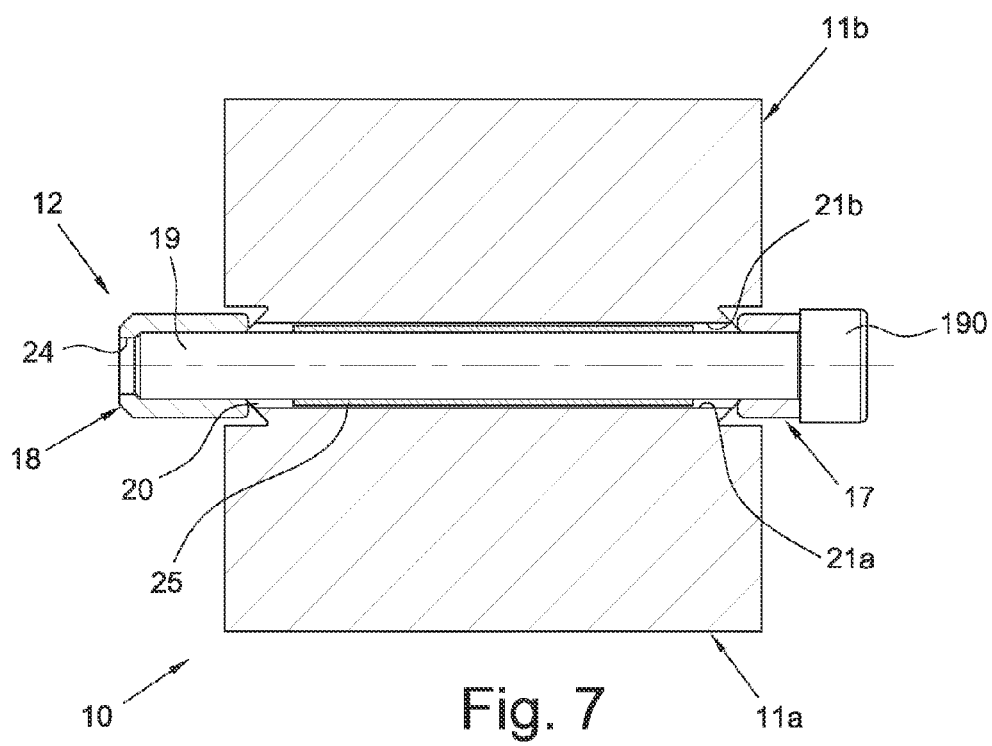
FIG. 7 is a cross-section according to the VII-VII plane of FIG. 3.
Figure 8:
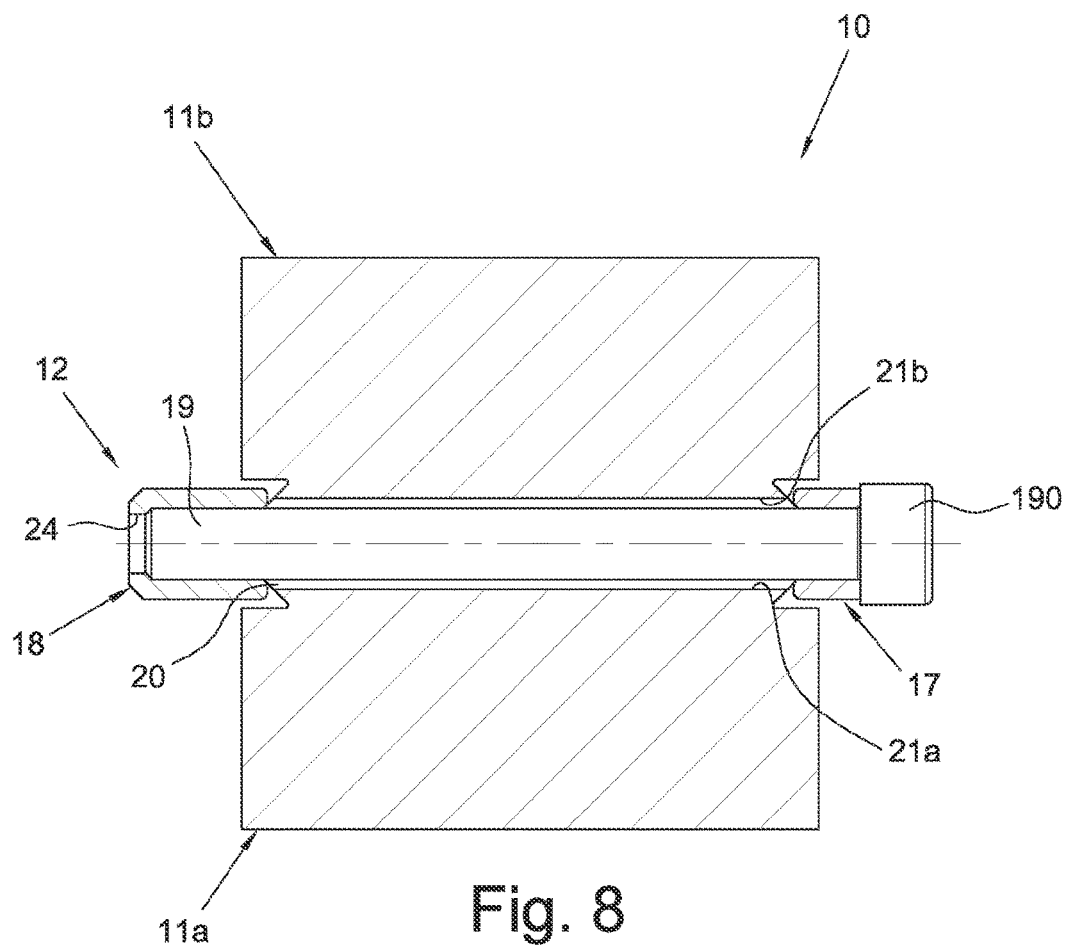
FIG. 8 is a cross-section according to the VIII-VIII plane of FIG. 3.
Figure 9:
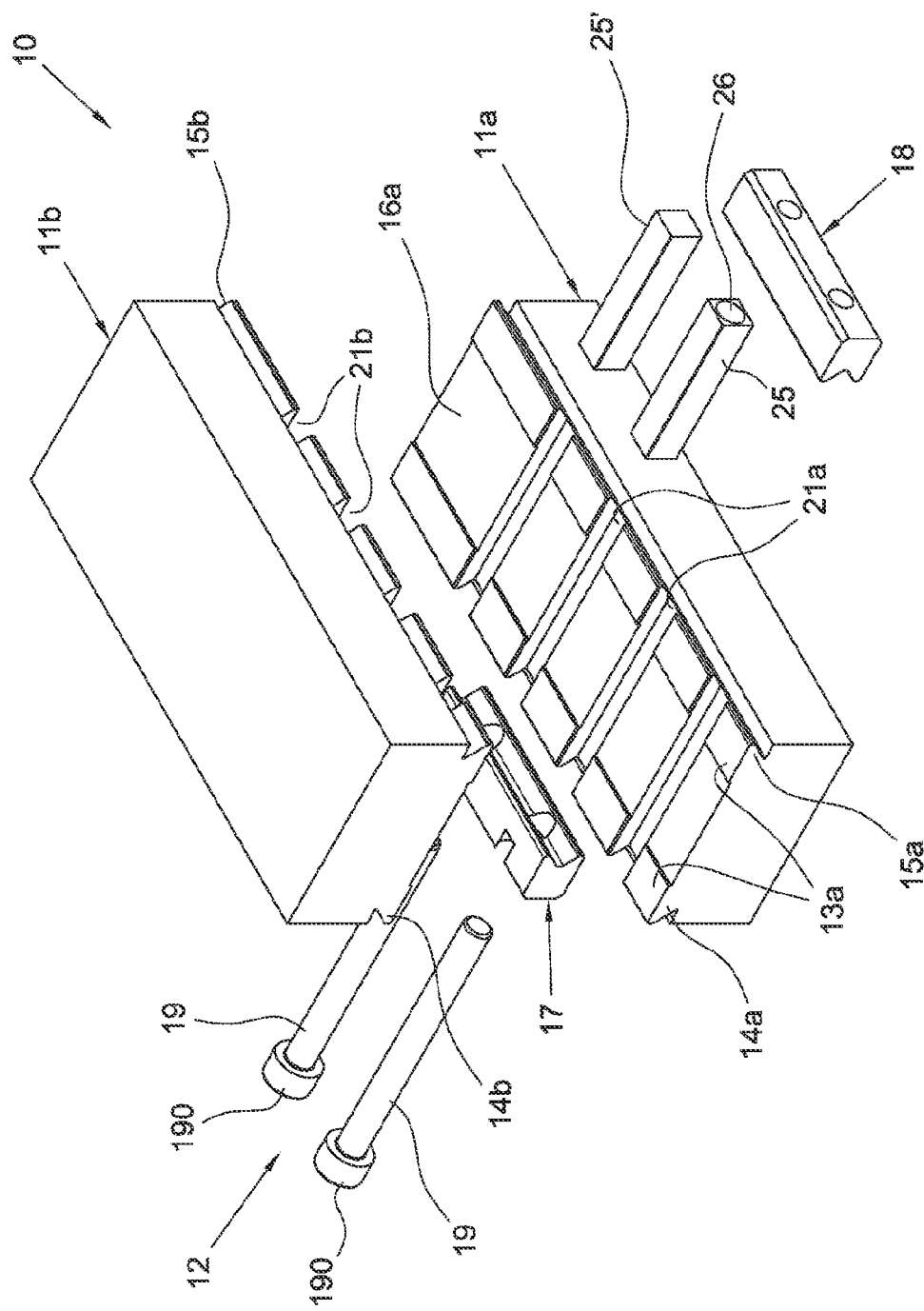
FIG. 9 is an axonometric and exploded view of an alternative embodiment of the connection arrangement according to the present invention.

In this case, therefore, the tongues 25 can be inserted into the same seats 20 for housing the threaded stems 19 (FIGS. 1-7).

It is also possible for the tongues 25' to be formed from full solids, in which case they are housed in grooves 21a, 21b other than those defining the seats 20 for housing the threaded stems 19.

The tongues 25, 25' act as both reference elements of the relative position of the two bodies 11a, 11b along the direction of the length L, and as a further constraining element adapted to prevent a relative sliding of the two bodies 11a, 11b along the same direction.

The object of the present invention is also a component of a mechanical automation group of movements, such as for example, an actuator of the linear or rotary type, a slide, pliers, a section bar, a guiding section bar or the like, which comprises a body 11a, 11b as described above with reference to the accompanying figures.

These components could be interconnected to each other with constraining groups of a known type and as described for example in U.S. Pat. No. 5,123,770, obviously without the respective mutual rest surfaces 13a, 13b resting one against the other.

The object of the present invention is also a constraining group 12 for components of a mechanical automation group of movements as described above with reference to the accompanying figures.

The operation of the present invention and in particular the assembly and disassembly steps of the connection arrangement 10 are immediately understandable by a person skilled in the art in light of the above description and of the accompanying figures.

Subject to any arrangement of one or more tongues 25 and/or 25' in corresponding one or more grooves 21a, 21b, the two bodies 11a, 11b are positioned next to one another with the surfaces 13a, 13b mutually resting one on the other and coinciding with each other least along the dimension D, so that the coupling profiles 14a, 15a and 14b, 15b of the respective dovetail portions overlap one another and the grooves 21a, 21b face each others to define seats 20.

The two tightening clamps 17 and 18 are positioned next to each other on the pairs of coupling profiles 14a, 14b and 15a, 15b mutually overlapping and joined by means of one or more threaded stems 19.

The threaded stems 19 are housed in the seats 20 and/or in the axial hole 26 of any tongue 25.

Both the seats 20 and the through holes 26 of the tongues 25 are sized in such a way that the threaded stems 19 are housed with clearance therein, i.e. without there being direct contact between these elements.

It should be noted in particular that, in the assembly and connection configuration, the two bodies 11a and 11b are each in direct contact with the other in correspondence of the respective mutual rest surface 13a, 13b, without any insert or spacer being interposed between these surfaces. This allows both the containment of the dimensions of the connection arrangement 10 considered as a whole, and the increase of the rigidity of connection.

The possible presence of the tongues 25, 25' allows references of the relative position of the two bodies 11a, 11b to be created, which can therefore be disassembled and reassembled in the same spatial arrangement in a simple and rapid manner.

Furthermore, any tongues 25, 25' act as further constraining and stiffening members of the connection of the two bodies 11a, 11b in particular adaptable to preventing sliding and movement of the two bodies 11a, 11b along the direction L due to excessive loads and/or vibrations.

The connection arrangement object of the present invention has the advantage of being particularly compact and have contained dimensions and allows a more rigidity of connection to be obtained.

It also allows the determination and replication of the relative position of the two bodies connected together, so as to be able to carry out subsequent disassembly and reassembly operations of the two bodies themselves with ease and precision.

The components for the production of a mechanical automation group of movements according to the present invention, as well as the removable constraining group of these components according to the present invention, are structurally and constructively simple and, as concerns the characteristics inherent to their connection, can be easily "standardised" and "normalised" in the form of modules combinable and assemblable between them in order to produce a desired movements automation group.

The connection arrangement thus devised is in any case susceptible to numerous modifications and variants, all of which fall under the invention; moreover, all the details can be substituted by technically equivalent elements.

For example, the mutual rest surfaces of the two bodies could not have the form of two projections, but could extend continuously between two successive grooves; the connection member of the two tightening clamps could be connected thereto by means of nuts; the shape and, in particular, the transverse section of the grooves, of the seats that they define and of the tongues could differ from the one represented in the accompanying figures.

In practice, any materials and any dimensions can be used depending on the technical requirements.

The invention claimed is:

1. A connection arrangement (10) of components of a mechanical automation group of movements comprising at least two bodies (11a, 11b), having at least a first body and a second body where said first body is adapted to be connected to said second body with a constraining group (12) that is removably attached to said at least two bodies (11a, 11b) wherein said first body and said second body comprise:

first and second rest surfaces (13a, 13b) on each of said first body and said second body for resting said first body and said second body on each other and a coupling profile (14a, 15a, 14b, 15b) on said first and second rest surfaces (13a,13b) where said constraining group (12) is positioned at two opposite perimetric portions of said first and second rest surfaces (13a, 13b), wherein said constraining group (12) comprises at least one pair of tightening clamps (17, 18) engageable with said coupling profiles (14a, 15a, 14b, 15b) where said at least one pair of tightening clamps (17,18) are removably connectable to each other by at least one connecting member (19), wherein said connecting member (19) is housed in a corresponding seat (20) defined by at least two grooves (21a, 21b) where at least one of said two grooves (21a,21b) is positioned in each of said two bodies (11a, 11b) and said at least one of said two grooves (21a,21b) in each of said two bodies passes between said two opposite perimetric portions of said first and second rest surfaces (13a,13b), said constraining group (12) further comprises at least one tongue (25, 25') that is removably insertable into said at least one groove (21a, 21b) of each of said at least two bodies (11a, 11b) and said at least one tongue (25) comprises an axial through hole (26) for passage therethrough of said at least one connecting member (19).

2. The connection arrangement (10) according to claim 1, characterized in that said first and second rest surfaces (13a, 13b) of said at least two bodies (11a, 11b) coincide with each other along at least one dimension (D).

3. The connection arrangement (10) according to claim 2, characterized in that said first and second rest surfaces comprise opposite perimetric portions of said first and second rest surfaces (13a, 13b).

4. The connection arrangement (10) according to claim 3, characterized in that said opposite perimetric portions of each of said first and second rest surfaces (13a, 13b) are defined by straight lines parallel to each other and orthogonal to said dimension (D).

5. The connection arrangement (10) according to claim 2, characterized in that said at least one groove (21a, 21b) extends in parallel to said dimension (D).

6. The connection arrangement (10) according to claim 1, characterized in that said at least one groove (21a, 21b) is open at said first and second rest surfaces (13a, 13b) of said at least two bodies (11a, 11b).

7. The connection arrangement (10) according to claim 6, wherein, in a connection configuration, said at least one groove (21a, 21b) of one of the said two bodies (11a, 11b) faces at least one groove (21a, 21b) of the other of the said two bodies (11a, 11b) to define said corresponding seat (20).

8. The connection arrangement (10) according to claim 7, characterized in that each of the said two bodies (11a, 11b) comprises a plurality of said grooves (21a, 21b) arranged parallel to each other and at a defined distance from each other, wherein, in a connection configuration, at least a part of a groove (21a, 21b) of one of the said two bodies (11a, 11b) faces at least a part of a groove (21a, 21b) of the other of the said two bodies (11a, 11b) to define said corresponding seat (20).

9. The connection arrangement (10) according to claim 1, characterized in that each tightening clamp of said at least one pair of tightening clamps (17,18) each comprise a pair of flat internal surfaces (171, 172, 181, 182), connected to form a V-shape and each of said coupling profiles (14a, 14b, 15a, 15b) of each of said two bodies (11a, 11b) comprise inclined flat walls (140a, 140b, 150a, 150b) which extend from said first and second rest surfaces (13a, 13b) to form an acute angle therewith, wherein, in a connection configuration, said pair of flat internal surfaces (171, 172, 181, 182) of each tightening clamp of said at least one pair of tightening clamps (17,18) rest on said inclined flat walls (140a, 140b, 150a, 150b) of said at least two bodies (11a, 11b), wherein said first and second rest surfaces (13a, 13b) of said at least two bodies (11a, 11b) rest on each other.

10. The connection arrangement (10) according to claim 1, characterized in that said at least one connecting member (19) consists of a threaded stem having opposite ends which are associated with the tightening clamps (17, 18) of said at least one pair of tightening clamps.

11. A component of a mechanical automation group characterized in that it said component comprises at least two bodies (11a, 11b) having at least a first body and a second body, provided with first and second rest surfaces (13a, 13b) on said at least two bodies (11a,11b), a coupling profile (14a, 15a, 14b, 15b) with a constraining group (12) positioned at least in correspondence with at least two opposite perimetric portions of said first and second rest surfaces (13a, 13b), wherein said constraining group (12) comprises at least one pair of tightening clamps (17, 18) which are removably connected to each other by at least one connecting member (19), and at least one groove (21a, 21b) in each of said two bodies (11a,11b) which passes between said two opposite perimetric portions of said first and second rest surfaces (13a,13b) and including at least one pair of tightening clamps (17, 18) which are associated with corresponding coupling profiles (14a, 15a, 14b, 15b) of said at least two bodies (11a, 11b) and which are removably connected to each other by at least one connecting member (19), characterized in that each tightening clamp (17, 18) of said at least one pair of tightening clamps comprises a pair of flat internal surfaces (171, 172, 181, 182) connected to form a V-shape that is engageable in a resting position on said coupling profiles (14a, 15a, 14b, 15b) and in that said connecting member (19) is positioned in a seat (20) defined by said at least one groove (21a, 21b) in each one of said two bodies (11a, 11b).

12. The component according to claim 11, characterized in that said opposite perimetric portions of said rest surface (13a, 13b) develop along a respective straight line, wherein the lines along which said opposite perimetric portions develop, are parallel to each other and orthogonal to a dimension (D) of said rest surface.

13. The component according to claim 12, characterized in that said at least one groove (21a, 21b) extends in parallel to said dimension (D).

14. The component according to claim 11, characterized in that said at least one groove (21a, 21b) is open in correspondence of said rest surface (13a, 13b).

15. The component according to claim 11, characterized in that said body (11a, 11b) comprises a plurality of said grooves (21a, 21b) that are arranged parallel to each other and at a defined distance from each other.

16. The component according to claim 11, characterized in that each of said coupling profiles (14a, 15a, 14b, 15b) comprises an inclined flat wall (140a, 150a, 140b, 150b) which extends from the respective said first and second rest surfaces (13a, 13b) to form an acute angle with said first and second rest surfaces (13a,13b).

17. The component according to claim 11, characterized in that said constraining group (12) further comprises at least one tongue (25, 25') which is removably insertable into said at least one groove (21a, 21b) of at least one of the said two bodies (11a, 11b).

18. The component according to claim 11, characterized in that said at least one tongue (25) comprises a axial through hole (26) for the passage therein of said at least one connecting member (19).

* * * * *